(No Model.)

S. J. TALBOTT.
VELOCIPEDE SLED.

No. 407,623. Patented July 23, 1889.

Witnesses
Albert E. Leach
M. H. Thompson

Inventor
Sylvanus J. Talbott
By his Attorney

UNITED STATES PATENT OFFICE.

SYLVANUS J. TALBOTT, OF MILFORD, NEW HAMPSHIRE, ASSIGNOR OF ONE-HALF TO JOHN McLANE, OF SAME PLACE.

VELOCIPEDE-SLED.

SPECIFICATION forming part of Letters Patent No. 407,623, dated July 23, 1889.

Application filed December 17, 1888. Serial No. 293,811. (No model.)

*To all whom it may concern:*

Be it known that I, SYLVANUS J. TALBOTT, a citizen of the United States, residing at Milford, in the county of Hillsborough and State of New Hampshire, have invented certain new and useful Improvements in Velocipede-Sleds, of which the following is a full specification.

Figure 1:
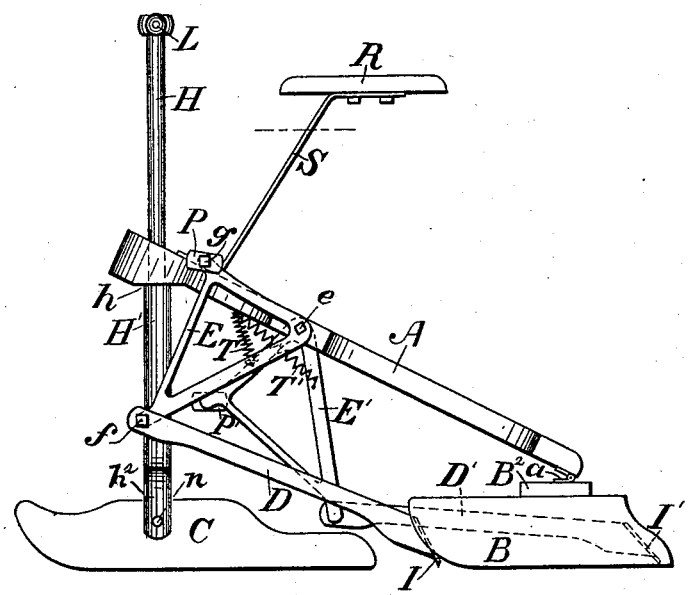
Figure 2:
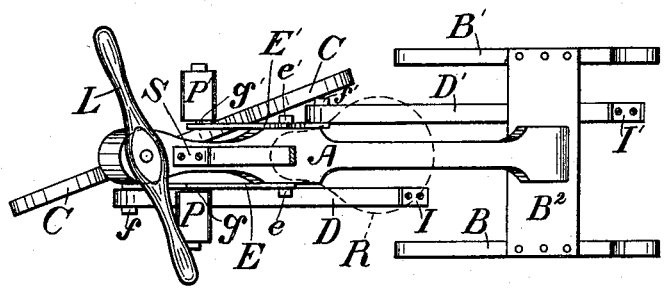

Of the accompanying drawings, Figure 1 is a side elevation, and Fig. 2 is a plan view, of my improved velocipede-sled with the seat removed.

My invention consists of an improved ice-velocipede or velocipede-sled adapted to be used on ice or snow, and constructed as hereinafter fully described.

A is the inclined backbone of my improved velocipede, preferably made in a single piece and pivoted to the rear bob in any desired manner, as by a hinge $a$.

H H' is a steering-rod, the upper portion of which H passes through a hole in the forward end of the backbone A, the lower portion H' being enlarged to form a bearing or shoulder $h$, on which rests the surface $h'$ of the backbone, which is perpendicular to the axis of the steering-rod H H', in such a manner that the steering-rod may easily turn within the hole.

L is the handle-bar, secured to the upper end of the steering-rod H. The lower end of the steering-rod is preferably bifurcated, as at $h^2$, to embrace the forward runner C, which serves as a rudder, and which is secured thereto preferably by means of the pin $n$. The rudder may be secured to the steering-rod, however, in any desired manner, though the point of attachment is preferably nearer the front than the rear of the rudder, for reasons hereinafter to be explained. The rear bob of the velocipede is preferably made of two runners B B', connected by the cross-bar $B^2$.

R is the seat, secured to the upper end of the spring-bar S, the lower end of which is screwed or bolted to the backbone.

D D' are the propelling-bars, one on each side of the velocipede and pivoted at $f f'$ to the bell-crank levers E E'. These levers, preferably triangular-shaped, are in turn pivoted at $e e'$ to either side of the backbone, and to them are pivotally secured at $g g'$ the pedals P P'. To the rear of the propelling-bars D D' are screwed or otherwise secured the claws I I', preferably of sharp-pointed metal.

T T' are springs secured at one end to the backbone A, preferably on the under side thereof, and at their lower ends to the levers E E', respectively, in such a manner as to normally hold the levers in the position occupied by the lever E in the drawings—that is, with the propelling-bar D at its extreme forward position and the pedal E at the highest point of its path.

The action of my improved velocipede is as follows: The pedal on one side being in its uppermost position, as shown by the pedal P, with the propelling-bar D at its forward arm, the said pedal is pressed downward by the foot, which causes the propelling-bar to assume the position indicated by D' in Fig. 1, the claw I being of such a shape as to dig into the ice or snow, and thus propel the sled forward. At the end of the stroke the foot is raised, and under the influence of the spring acting on the lever E the propelling-bar attached to the said lever again assumes its forward position. By securing the rudder C to the steering-rod, as herein shown, with the point of attachment considerably in advance of the center of the runner, great advantage is gained from the fact that the tendency of this arrangement is to keep the said rudder normally parallel to the line of motion, the friction of the ice or snow on that part of the runner to the rear of the point of attachment tending to keep the runner normally in line with the longitudinal axis of the velocipede, even if the hands are removed from the handle-bar, thus causing the velocipede to ordinarily move in a straight line.

I do not confine myself to the use of two rear runners B B', as I may employ a single runner hinged to the backbone A, thus forming a velocipede of two single runners preferably in the same line. I may, moreover, instead of employing the vertical steering-rod H H', give to the rod more or less of an incline or rake, with the point of attachment of the rod to the runner C somewhat in advance of the handle-bar H.

A velocipede-sled constructed as herein shown, with an inclined backbone pivoted directly to the rear bob, combines in a very simple manner the steadiness of motion and adaptability of the runners to unevenness in the track found in a double bob-sled with the simple method of steering and the same pedal motion found in the velocipede, without the employment of a wheel whose rim is furnished with spikes or claws, as found in ice-velocipedes commonly in use.

I claim—

1. A velocipede-sled consisting of a backbone hinged at the rear to a sled-bob, in combination with propelling-bars and a steering-rod provided with a rudder at the lower end thereof, all arranged and operated substantially as and for the purposes described.

2. In a velocipede-sled, a triangular-shaped one-piece spring-actuated bell-crank lever pivoted near one corner to the inclined backbone of the velocipede and having pivotally secured thereto, near its other two corners, a pedal and a rearwardly-projecting propelling-bar provided with a claw, substantially as and for the purposes described.

3. In a velocipede-sled, a steering-rod, in combination with a rudder secured thereto at a point in advance of the center, substantially as and for the purposes described.

In witness whereof I have hereunto set my hand.

SYLVANUS J. TALBOTT.

Witnesses:
 WM. B. H. DOWSE,
 ALBERT E. LEACH.